United States Patent [19]

Schaaf

[11] Patent Number: 5,153,017
[45] Date of Patent: Oct. 6, 1992

[54] METHOD OF MAKING EXPANDED FOODSTUFFS

[76] Inventor: Heinz-Josef Schaaf, Quellenweg 19a, 6277 Bad Camberg-Oberselters, Fed. Rep. of Germany

[21] Appl. No.: 691,172

[22] Filed: Apr. 24, 1991

Related U.S. Application Data

[63] Continuation of Ser. No. 274,059, filed as PCT/EP88/00286, Apr. 7, 1988, abandoned.

[30] Foreign Application Priority Data

Apr. 8, 1987 [DE] Fed. Rep. of Germany ....... 3711840

[51] Int. Cl.⁵ ................................................. A23L 1/18
[52] U.S. Cl. ...................................... 426/439; 426/440; 426/518; 426/808
[58] Field of Search ................ 426/439, 440, 518, 808

[56] References Cited

U.S. PATENT DOCUMENTS

| | | | |
|---|---|---|---|
| 2,463,112 | 3/1949 | Kipnis | 426/439 |
| 4,567,051 | 1/1986 | Baker et al. | 426/439 |
| 4,803,091 | 2/1989 | Mottur et al. | 426/439 |

FOREIGN PATENT DOCUMENTS 2055545 3/1981 United Kingdom .
2073573 10/1981 United Kingdom .

*Primary Examiner*—Jeanette Hunter
*Assistant Examiner*—Mary S. Mims
*Attorney, Agent, or Firm*—Anthony J. Casella; Gerald E. Hespos

[57] ABSTRACT

In the method of making expanded foodstuffs in which a dough emerges from the nozzle of an extruder and the extrudate is subjected to an after-treatment in a hot medium, the extrudate is kept after emergence from the nozzle at a temperature which corresponds substantially to the emergence temperature of the dough and the after-treatment takes place directly after the extrusion. In particular the dough can be extruded directly into hot oil or fat. Since after the extrusion no cooling of the extrudate takes place, in particular by water evaporation, the extrudate can be further expanded in the a after-treatment and a foodstuff is obtained with a texture which is identical to the texture of foodstuffs which after the extrusion and prior to the treatment in a hot medium have been subjected to a drying process.

4 Claims, No Drawings

METHOD OF MAKING EXPANDED FOODSTUFFS

This application is a continuation of application Ser. No. 07/274,059 filed as PCT/EP88/00286, Apr. 7, 1988, now abandoned.

The invention relates to a method of making expanded foodstuffs, a dough emerging from the nozzle of an extruder and the extrudate being subjected to an after-treatment in a hot medium.

Essentially two methods are known for the extrusion technique production of expanded foodstuffs, so-called snacks.

In the so-called direct expansion the dough is processed at high temperatures and pressures and expands into its final form on emergence from the nozzle of the extruder.

In the so-called indirect expansion the dough is pressed at lower temperature and lower pressure through the nozzle of an extruder. The dough becomes pasty in the extruder. The resulting product is similar to pasta. In a subsequent complicated drying process lasting 4 to 8 hours the moisture of the extrudate is reduced to about 11% and after a further conditioning time the extrudate is either placed in hot fat or in hot air for the expansion.

In the extrusion method with direct expansion usually extrusion moisture contents of 13% to 22% are employed whilst in the extrusion with indirect expansion the moisture content of the raw material is about 28% to 40%. The reduction to a moisture content of about 11% takes place in a drying process, as mentioned above.

Furthermore, various methods of making expanded foodstuffs are known which combine the extrusion with direct expansion with an after-treatment in hot fat. The extrudate is baked in hot fat after emerging from the nozzle and cutting. On emergence from the nozzle the extrudate is subjected to a cooling by the expansion taking place and water evaporation. The after-treatment in hot fat thus has primarily a drying and roasting character and a volume or texture change of the foodstuff is not achieved.

The advantage of extrusion with indirect expansion over the method employing dried semiproducts (as a rule in the form of pellets) is that very specific flavour and texture results of the foodstuff can be achieved which in their quality are higher than those of directly expanded extrudates. The disadvantage of the production method with indirect expansion is however that such an apparatus for making the semiproducts and drying thereof is very complicated and expensive. In addition, a quality control and obtaining constant quality is very complicated and obtainable only with great difficulty. Furthermore, the energy consumption for the manufacturing is very high when using this method.

The invention is based on the problem of providing a method which gives foodstuffs with taste and texture properties which correspond to those of foodstuffs made with a method with indirect expansion but avoids the disadvantages of the latter method, in particular the high costs and the difficult quality control.

This problem is solved according to the invention in that the extrudate is kept after emergence from the nozzle at a temperature which corresponds substantially to the emergence temperature of the dough and that the after-treatment takes place directly after the extruding.

According to the invention the extrudate is subjected directly to a strong heat treatment in hot oil, hot air or hot steam without intermediate cooling at higher temperatures (105° to 130° C.) than in the known method. The heat withdrawn from the extrudate by evaporation of water in the expansion after emergence from the nozzle does not result in an otherwise usual hornification of the dough and termination of the expansion but instead due to the heat carrier into which the extrudate is conducted a considerable amount of heat is supplied, the viscosity of the dough thereby being reduced and a considerably greater expansion effected. The resulting texture, in particular the crispiness and the chewing feeling of the extruded foodstuff, is identical to the product otherwise produceable only by extrusion with indirect expansion. Consequently, with the method according to the invention foodstuffs of high quality are obtained and complicated apparatuses for drying and conditioning semifinished products can be dispensed with. Whereas a conventional apparatus for making pellets and carrying out the necessary process steps costs about DM 2 million, a plant for carrying out the method according to the invention costs less than half this sum. Since a tedious drying of semi-finished products is dispensed with the quality control and the quality constancy of extruded and expanded foodstuffs is simpler. In addition the energy consumption is greatly reduced with the method according to the invention.

According to a preferred embodiment the dough is extruded from the extruder directly into hot oil or fat. The nozzle of the extruder is preferably disposed in the hot fat or oil.

According to a further preferred embodiment the extrudate is conducted through a passage in which a temperature and a moisture content obtain which are equal to the temperature and the moisture content of the extrudate so that neither a heat nor a moisture loss of the extrudate occurs before the latter is introduced for example into hot oil or fat. In the passage through which the extrudate is conducted preferably vapours of the medium in which the after-treatment of the extrudate takes place are contained. The medium for the after-treatment of the extrudate may be hot fat, oil, hot air or hot steam. It is for example possible to conduct hot air to the nozzle with a temperature of for example 600° C.

I claim:

1. In a process for producing expanded foodstuffs which comprises extruding a dough extrudate through the nozzle of an extruder for expanding said dough extrudate at said nozzle, and then subjecting said dough extrudate to a hot medium for an after-treatment, the improvement comprising the intermediate step of subjecting the dough extrudate after emergence from the nozzle to a heat treatment in hot oil, hot air or hot steam, without any intermediate cooling, at a temperature which corresponds substantially to the emergence temperature of the dough extrudate from said nozzle whereby the viscosity of the dough extrudate is reduced to enhance expansion of said dough extrudate, and to maintain the temperature and moisture content of said dough extrudate prior to said step of after-treatment.

2. Process according to claim 1, wherein the heat treatment is applied directly to the extrudate.

3. Process according to claim 2, wherein the heat treatment is provided by hot air that is applied to the nozzle of the extruder.

4. Process according to claim 3, wherein hot air of 600° C. is applied to the nozzle.

* * * * *